United States Patent
Romine et al.

(10) Patent No.: US 7,805,423 B1
(45) Date of Patent: Sep. 28, 2010

(54) SYSTEM AND METHOD FOR QUIESCING SELECT DATA MODIFICATION OPERATIONS AGAINST AN OBJECT OF A DATABASE DURING ONE OR MORE STRUCTURAL OPERATIONS

(75) Inventors: William Romine, Tustin, CA (US); Ross Doering, Aliso Viejo, CA (US)

(73) Assignee: Quest Software, Inc., Aliso Viejo, CA (US)

( * ) Notice: Subject to any disclaimer, the term of this patent is extended or adjusted under 35 U.S.C. 154(b) by 1929 days.

(21) Appl. No.: 09/713,479

(22) Filed: Nov. 15, 2000

Related U.S. Application Data

(60) Provisional application No. 60/165,591, filed on Nov. 15, 1999, provisional application No. 60/182,073, filed on Feb. 11, 2000, provisional application No. 60/241,865, filed on Oct. 20, 2000.

(51) Int. Cl.
*G06F 17/30* (2006.01)

(52) U.S. Cl. .................. 707/704; 707/638; 707/639; 707/648

(58) Field of Classification Search ......... 707/200–206, 707/100–102, 8
See application file for complete search history.

(56) References Cited

U.S. PATENT DOCUMENTS

| | | | |
|---|---|---|---|
| 4,130,867 A | 12/1978 | Bachman et al. | |
| 5,222,235 A | 6/1993 | Hintz et al. | |
| 5,297,279 A * | 3/1994 | Bannon et al. | 707/103 R |
| 5,325,505 A | 6/1994 | Hoffecker et al. | 707/101 |
| 5,333,314 A | 7/1994 | Masai et al. | |
| 5,422,979 A | 6/1995 | Eichfeld et al. | 706/4 |
| 5,455,945 A | 10/1995 | VanderDrift | 707/2 |
| 5,551,020 A | 8/1996 | Flax et al. | 707/101 |
| 5,553,303 A * | 9/1996 | Hayashi et al. | 707/2 |
| 5,596,747 A * | 1/1997 | Katabami et al. | 707/101 |
| 5,721,915 A | 2/1998 | Sockut et al. | 707/200 |
| 5,761,667 A | 6/1998 | Koeppen | 707/101 |
| 5,774,717 A | 6/1998 | Porcaro | |
| 5,778,377 A | 7/1998 | Marlin et al. | 707/103 R |
| 5,778,392 A | 7/1998 | Stockman et al. | 707/205 |
| 5,799,322 A | 8/1998 | Mosher, Jr. | |
| 5,822,780 A | 10/1998 | Schutzman | 711/165 |
| 5,848,416 A | 12/1998 | Tikkanen | 707/101 |
| 5,893,924 A | 4/1999 | Bahls et al. | 711/165 |

(Continued)

OTHER PUBLICATIONS

K. Loney, et al., "*Oracle8i, DB Handbook,*"Oracle Press, 2000, pp. 20.

(Continued)

*Primary Examiner*—Debbie Le
(74) *Attorney, Agent, or Firm*—Knobbe, Martens Olson & Bear, LLP

(57) ABSTRACT

The invention is a reorganization system having a reorganization application, a database management system, and one or more database files. The reorganization application communicates with the database management system and the one or more database files to reorganize an object, such as, for example, a table or index, while providing one or more clients substantially continuous access to the object. The reorganization application employs one or more trigger locks to synchronize the data in an original table and a reorganized table. The one or more trigger locks block select data modification operations while allowing one or more read-only operations and structural modification operations.

28 Claims, 8 Drawing Sheets

U.S. PATENT DOCUMENTS

| | | | |
|---|---|---|---|
| 5,933,820 A | 8/1999 | Beier et al. | 707/1 |
| 5,940,832 A | 8/1999 | Hamada et al. | 707/100 |
| 5,943,677 A | 8/1999 | Hicks | 707/205 |
| 5,956,504 A | 9/1999 | Jagadish et al. | |
| 5,983,239 A | 11/1999 | Cannon | 707/200 |
| 5,991,761 A | 11/1999 | Mahoney et al. | 707/100 |
| 5,995,958 A | 11/1999 | Xu | 707/3 |
| 6,003,022 A | 12/1999 | Eberhard et al. | |
| 6,016,497 A * | 1/2000 | Suver | 707/103 R |
| 6,026,412 A * | 2/2000 | Sockut et al. | 707/200 |
| 6,029,195 A | 2/2000 | Herz | |
| 6,070,170 A * | 5/2000 | Friske et al. | 707/202 |
| 6,119,128 A | 9/2000 | Courter et al. | |
| 6,122,640 A * | 9/2000 | Pereira | 707/103 R |
| 6,157,932 A | 12/2000 | Klein et al. | |
| 6,161,607 A | 12/2000 | Lomet | |
| 6,289,357 B1 | 9/2001 | Parker | |
| 6,343,296 B1 * | 1/2002 | Lakhamraju et al. | 707/103 R |
| 6,363,387 B1 * | 3/2002 | Ponnekanti et al. | 707/10 |
| 6,411,964 B1 * | 6/2002 | Iyer et al. | 707/200 |
| 6,460,048 B1 * | 10/2002 | Teng et al. | 707/103 R |
| 6,470,344 B1 | 10/2002 | Kothuri et al. | |
| 6,477,535 B1 | 11/2002 | Mirzadeh | |
| 6,499,039 B1 * | 12/2002 | Venkatesh et al. | 707/204 |
| 6,519,613 B1 * | 2/2003 | Friske et al. | 707/202 |
| 6,584,474 B1 | 6/2003 | Pereira | |
| 6,721,742 B1 * | 4/2004 | Uceda-Sosa et al. | 707/10 |
| 6,950,834 B2 * | 9/2005 | Huras et al. | 707/202 |
| 2002/0049776 A1 | 4/2002 | Arnoff et al. | |

OTHER PUBLICATIONS

L. Leverenz, et al., "*Oracle8i Concepts*," Oracle Corp, vol. 2, Release 8.1.5, 1999, pp. 20-3.

Oracle: Introduction to PL/SQL, Power Point Presentation Regarding Triggers, slides 4, 6-7, 11, 14-17, 28, and 51, http://training.ntsource.com/dpec/COURSES/PL1 /, 10 pages. downloaded and printed from the World Wide Web on Oct. 20, 2000.

Computer Associates, "*Platinum Tsreorg Automates Tablespace Reorganizations, Customer Story*", http://platinum.com/products/custstor/tsreorg.htm, 2 pages downloaded and printed from the World Wide Web on Nov. 30, 1999.

Computer Associates, "*Platinum OnlineReorg Technical Overview, OnlineReorg*", http://platinum.com/products/dba/onreo_to.htm, 5 pages downloaded and printed from the World Wide Web on Nov. 30, 1999.

Computer Associates, "*ProVision Tsreorg for Oracle, Brochure, Database Utilities Tsreorg for Oracle*", http://platinum.com/products/brochure/provis/pv_dr.htm, 4 pages downloaded and printed from the World Wide Web on Nov. 30, 1999.

Computer Associates, "*Rapid Reorg for DB2 for OS/390, Brochure*", http:// platinum.com/products/brochure/dm/b_rrd.htm, 3 pages downloaded and printed from the World Wide Web on Nov. 30, 1999.

Space Management and Reorganization: Challenges and Solutions, http://quest.com/whitepapers/space_manager_wp.doc, published on or around Dec. 21, 1999.

"Top Five Tips for Space Management and Reorganization," belived to be published after Jul. 21, 1998.

"Quest SharePlex for Oracle," Brochure, Quest Software, Inc., Nov. 1999, 4 pages.

* cited by examiner

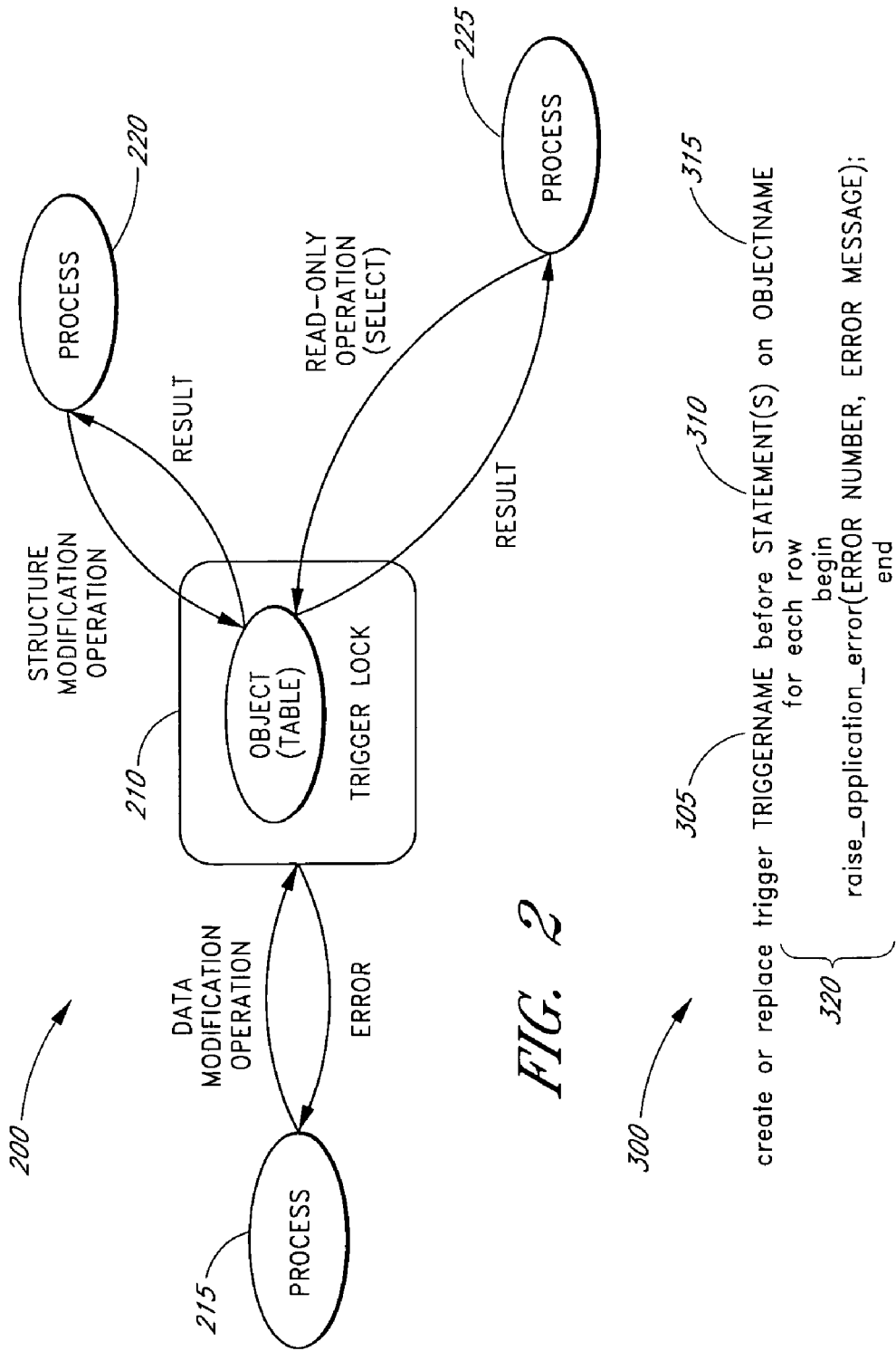

SYSTEM AND METHOD FOR QUIESCING SELECT DATA MODIFICATION OPERATIONS AGAINST AN OBJECT OF A DATABASE DURING ONE OR MORE STRUCTURAL OPERATIONS

REFERENCE TO RELATED APPLICATION

The present application claims priority benefit under 35 U.S.C. §119(e) from U.S. Provisional Application No. 60/165,591, filed Nov. 15, 1999, entitled "SYSTEM AND METHOD FOR REORGANIZING A DATABASE," U.S. Provisional Application No. 60/182,073, filed Feb. 11, 2000, entitled "SYSTEM AND METHOD FOR REPLICATING DATA," and from U.S. Provisional Application No. 60/241, 865 filed Oct. 20, 2000, entitled "SYSTEM AND METHOD FOR DEVELOPING A COST-EFFECTIVE REORGANIZATION PLAN FOR DATA REORGANIZATION," which are incorporated herein by reference.

BACKGROUND OF THE INVENTION

1. Field of the Invention

This invention relates in general to the reorganization of database objects while maintaining the availability of those objects to applications or users, and in particular to preventing data modification operations to an object within a database during one or more structural changes to the object.

2. Description of the Related Art

A database is generally a collection of information organized such that computer programs can quickly access desired portions of the information. The information is typically referred to as data and the computer program enabling a user to enter, modify, delete, or otherwise organize select data in the database, is often called a database management system (DBMS). Generally, DBMSs govern the internal organization of data. For example, the terms "relational," "network," "flat," "hierarchical," and the like, all refer to ways differing DBMSs organize data. Often, these different internal structures affect how quickly and flexibly data can be extracted from a database. The foregoing notwithstanding, DBMSs, such as those offered from Oracle Corporation or IBM, generally provide that the data of a database is stored in objects, such as tables or indices.

With the advent of highly sophisticated DBMSs, users are demanding virtually non-interrupted access from virtually anywhere to applications and data. Moreover, users are demanding that accesses occur at peak or near peak performance levels. However, as users or applications, hereinafter referred to as "clients," continually modify the data stored in a particular database, the performance of that database is often adversely affected. For example, as objects of a database grow and shrink in size, the database becomes fragmented, resulting in the database having a large footprint with excessive free space. Moreover, the changing objects may generate chained rows, resulting in a need for multiple disk accesses to acquire desired data. Thus, fragmentation and chaining generally increase data access times and decrease database performance. In order to maintain the accessibility and performance of a particular database, administrators often need to reorganize the objects of the database while maintaining access to the data within those objects.

Several reorganization solutions are available which provide for reorganization with minimal maintenance downtime. Generally, these reorganization solutions accomplish the foregoing by creating a copy of one or more objects of a database, such as a table or an index. During the copying process, the reorganization solution reads data from the original object and inserts that data into a reorganized object while providing some type of access to the original object. Thus, once all the data from the original object is inserted into the reorganized object, the reorganization of the original object is complete. Thereafter, changes to the original object that occurred during the copying process are applied to the reorganized object until both objects are in synchronization. Once the objects are in synchronization, the original object is archived and the reorganized object is renamed, or otherwise designated as, the original object.

The foregoing reorganization solution suffers from a variety of drawbacks. For example, DBMSs generally do not allow for the explicit scheduling of operations from, for example, the foregoing reorganization solution and various other clients attempting to access the original object. In order to determine a point of synchronization between the original object and the reorganized object during interrupting client access attempts, the foregoing reorganization solution typically bars or quiesces all client access to the objects during some or all of the reorganization process. In addition, DBMSs generally classify object-renaming operations and the application of relational constraints to objects as structural operations on those objects. In order to perform a series of structural operations, for example, renaming the reorganized object and applying relational constraints thereto, the reorganization solution often bars or quiesces all client access to the objects during such structural operations. Accordingly, the foregoing reorganization solutions do not maintain client access to objects undergoing reorganization. Therefore, a need exists for a mechanism that allows for synchronization between objects and that prevents select interrupting data modification operations to an object without sacrificing client access to the object.

Some DBMSs provide locking mechanisms for preventing destructive interaction between transactions accessing the same resource. For example, a bank account table in a database may include an entry for the current balance. When two transactions are attempting to update the same entry, they first each attempt to obtain a lock against the entry. The first transaction to obtain a lock on the entry usually prevents the second from doing the same. Thus, the first transaction will generally complete, or be rolled back, before releasing the lock. The release of the lock allows the second transaction to obtain the lock and proceed with its update.

Without the foregoing locking mechanisms, the two transactions may destructively interact. For example, the first and second transactions may obtain the same current balance, and the second transaction may first perform its update thereto. Then, if the first transaction fails for one of a number of common reasons, the first transaction rolls the current balance back to it pre-first transaction value. Thus, without the foregoing locking mechanisms, the update from the second transaction would be effectively lost.

The foregoing locking mechanisms are generally grouped into at least two types, data manipulation language (DML) locks and data definition language (DDL) locks. DML operations generally modify data within an object; for example, a DML operation may modify the foregoing current balance within a particular row of a bank account table. Examples of DML operations from the widely accepted structured query language (SQL) include "insert," "update," and "delete." DDL operations generally modify the structure of an object; for example, a DDL operation may change the name of an object or add a column to the same. DML locks can generally be explicitly acquired by a transaction, while DDL locks generally cannot. Moreover, when a particular transaction has already acquired either type of lock on a particular resource, another transaction will have to wait until that lock is released before obtaining any other DML or DDL locks.

Although the foregoing locks provide a mechanism to quiesce activity against the object, use of the foregoing locks is limited. For example, when multiple clients send multiple transactions to a database object, many DBMSs do not allow for explicit scheduling of operations from any one client. Thus, multiple DML or DDL operations from a reorganization solution may have many interrupting and destructive operations from other clients. In addition, some DBMSs do not allow for explicit requests for a DDL lock, resulting in difficulty performing a series of DDL operations. For example, without the ability for an explicit reservation of a DDL lock by a transaction, a DML operation from another client may be scheduled between a series of DDL operations from the reorganization solution. That interrupting DML operation may throw off a synchronization attempt. Moreover, although DML locks typically may be explicitly reserved, they also are released before any DDL operations are allowed on the object. Thus, explicit DML locks also do not provide for a mechanism for ensuring a series of DDL operations will be performed on a object without one or more interrupting and destructive DML operations.

DBMSs also provide mechanisms for ensuring relational constraints are maintained. A relational constraint occurs when two or more tables within a database have data related to one another. For example, a first table may contain information related to purchase orders, such as, a purchase order number, a purchaser name and address, and the like. A second table may contain specific purchase items for each purchase order number. A relational constraint between the two tables may require that before purchase items can be entered into the second table, the purchase order number and purchaser information must be entered into the first table.

One mechanism for applying the foregoing relational constraint is a trigger procedure. Generally, trigger procedures are applied to an object such that upon the occurrence of one or more SQL statements, particular actions are taken. For example, a trigger procedure applied to the second table may execute, or fire, when an "insert" operation is requested against the second table. The trigger procedure may check the first table to ensure that purchase order and purchaser information exits, and when it does not, the trigger procedure may take actions to insert such information in the first table. Thereafter, the original "insert" operation on the second table completes. Accordingly, the foregoing trigger procedures generally forestall operations against a particular table in order to properly relate data in one table to data in another. Thus, trigger procedures are typically not applied to prevent data modification operations during one or more structural changes to an object.

SUMMARY OF THE INVENTION

Based on the above, a need still exists for a mechanism that can quiesce select activity on an object. In particular, a need exists for a mechanism that allows for synchronization between objects and that prevents select data modification operations to an object during one or more structural changes on the same. Moreover, the mechanism should not sacrifice client access to the object during the modifications. Accordingly, the present invention provides a mechanism for quiescing select activity against an object, and in particular, provides a mechanism that allows for synchronization between objects and that prevents data modification operations to an object during one or more structural changes on the object.

According to one aspect of the invention, the mechanism comprises a trigger lock. According to another aspect of the invention, the trigger lock fires prior to executing a first type of operation and, upon firing, executes one or more actions.

Therefore, one aspect of the invention includes a method of reorganizing a table in a database file while providing clients of the database file, substantially continuous access to data stored in the table. The method comprises reorganizing data of an original table by copying the data to a reorganized table, and during the copying, allowing modifications to the data of the original table while collecting records of the modifications. When the copying completes, the method also includes applying the modifications from the collected records against the reorganized table. The method further comprises applying a first trigger lock to the original table, the first trigger lock blocking select data modification operations against the original table while allowing other operations against the original table, applying any remaining modifications from the collected records against the reorganized table, and applying a second trigger lock to the reorganized table, the second trigger lock blocking select data modification operations against the reorganized table while allowing other operations against the reorganized table. The method also includes substituting the reorganized table for the original table, and removing the second trigger lock.

Another aspect of the invention includes a lock for blocking select operations against a object of a database file while allowing other operations against the object. The lock comprises one or more actions which block the execution of select data modification operations against an object by returning an error message in response to the select data modification operations. The lock also comprises one or more statements which, when attempted against the object, cause the one or more actions to be executed.

Another aspect of the invention includes a method of reorganizing a table within a database file. The method comprises inserting a first marker into a log file containing records of modification operations against an original table, wherein the insertion occurs when data of the original table starts to be copied to a reorganized table. The method also comprises inserting a second marker into the log file when the data of the original table is finished being copied to the reorganized table, inserting a third marker into the log file when select data modification operations are blocked from executing against the original table, and collecting the records of the modification operations from the log file occurring after the first marker and up until the third marker. The method also comprises applying the modification operations of the collected records to the reorganized file after determining that the second marker has been inserted.

Another aspect of the invention includes a method of reorganizing an object in a database. The method comprises reorganizing an original object by copying data from the original object to a reorganized object, and applying a trigger lock to the original object, the trigger lock blocking data modification operations from modifying the original object while allowing other operations to access the original object.

Another aspect of the invention includes a method of reorganizing an object in a database file. The method comprises reorganizing an original object by copying data from the original object to a reorganized object, and applying a trigger lock to the reorganized object, the trigger lock blocking data modification operations from modifying the reorganized object, while allowing other operations to access the reorganized object.

Another aspect of the invention includes a method of reorganizing an object in a database file. The method comprises reorganizing an original object by copying data from the original object to a reorganized object. The method also comprises when the original object included one or more relational constraints, applying at least one of the one or more relational constraints to the reorganized object, and allowing at least read-only access to the reorganized object while applying the at least one or more relational constraints.

Another aspect of the invention includes a method of reorganizing an object in a database. The method comprises reorganizing an original object by copying data from the original object to a reorganized object. The method also comprises substituting the reorganized object for the original object, and allowing read-only access to the data during at least a portion of the process of substituting the reorganized object for the original object.

Another aspect of the invention includes a reorganization system, comprising at least one database file having a table of data and a log file and a database management system communicating with the at least one database file, thereby governing the modification of the data in the table. The reorganization system also comprises a reorganization application communicating with the database management system to access the table and communicating with the database file to access the log file, wherein the reorganization application is configured to copy the data of the table to a reorganized table, to apply modifications from the log file corresponding to modifications to the table during the copying of the data, and to substitute the reorganized table for the table, thereby reorganizing the data of the table.

Another aspect of the invention includes a reorganization application for reorganizing an object in a database. The reorganization application comprises an execution thread which reorganizes an original object by copying data of the original object to a reorganized object, and which applies a trigger lock to the original object, wherein the trigger lock blocks data modification operations from modifying the original object while allowing other operations to access the original object.

Another aspect of the invention includes a reorganization application for reorganizing an object in a database. The reorganization application comprises an execution thread which reorganizes an original object by copying data of the original object to a reorganized object, and which applies a trigger lock to the reorganized object, wherein the trigger lock blocks data modification operations from modifying the reorganized object while allowing other operations to access the reorganized object.

Another aspect of the invention includes a reorganization application for reorganizing an object in a database. The reorganization application comprises an execution thread which reorganizes an original object by copying data of the original object to a reorganized object, wherein, when the original object included one or more relational constraints, the execution thread applies at least one of the one or more relational constraints to the reorganized object, and wherein the execution thread allows at least read-only access to the reorganized object while applying the at least one or more relational constraints.

Another aspect of the invention includes a reorganization application for reorganizing an object in a database. The reorganization application comprises an execution thread which reorganizes an original object by copying data of the original object to a reorganized object and which substitutes the reorganized object for the original object, wherein the execution thread also allows read-only access to the data during at least a portion of the substitution of the reorganized object for the original object.

Another aspect of the invention includes a method of controlling operations against an object. The method comprises applying a trigger lock to an object, wherein the trigger lock prevents a data modification operation that modifies data associated with object, and allows one or more structural operations that modify the definition of the object.

Another aspect of the invention includes a method of controlling operations against an object. The method comprises applying a trigger lock to an object, wherein the trigger lock prevents a data modification operation that modifies data associated with object, and allows a read-only operation that accesses the object.

These and other aspects, advantages, and novel features of the invention will become apparent upon reading the following detailed description and upon reference to the accompanying drawings. In the drawings, same elements have the same reference numerals.

BRIEF DESCRIPTION OF THE DRAWINGS

The present invention is described in more detail below in connection with the attached drawings, which are meant to illustrate and not limit the invention, and in which:

FIG. 2 illustrates a block diagram of the operation of a trigger lock according to aspects of an embodiment of the invention;

FIG. 3 illustrates an exemplary SQL statement for creating the trigger lock of FIG. 2, according to aspects of yet another embodiment of the invention;

DETAILED DESCRIPTION OF THE PREFERRED EMBODIMENT

The inventions are described in detail below with reference to the figures, wherein like elements are referenced with like numerals throughout.

Figure 1:
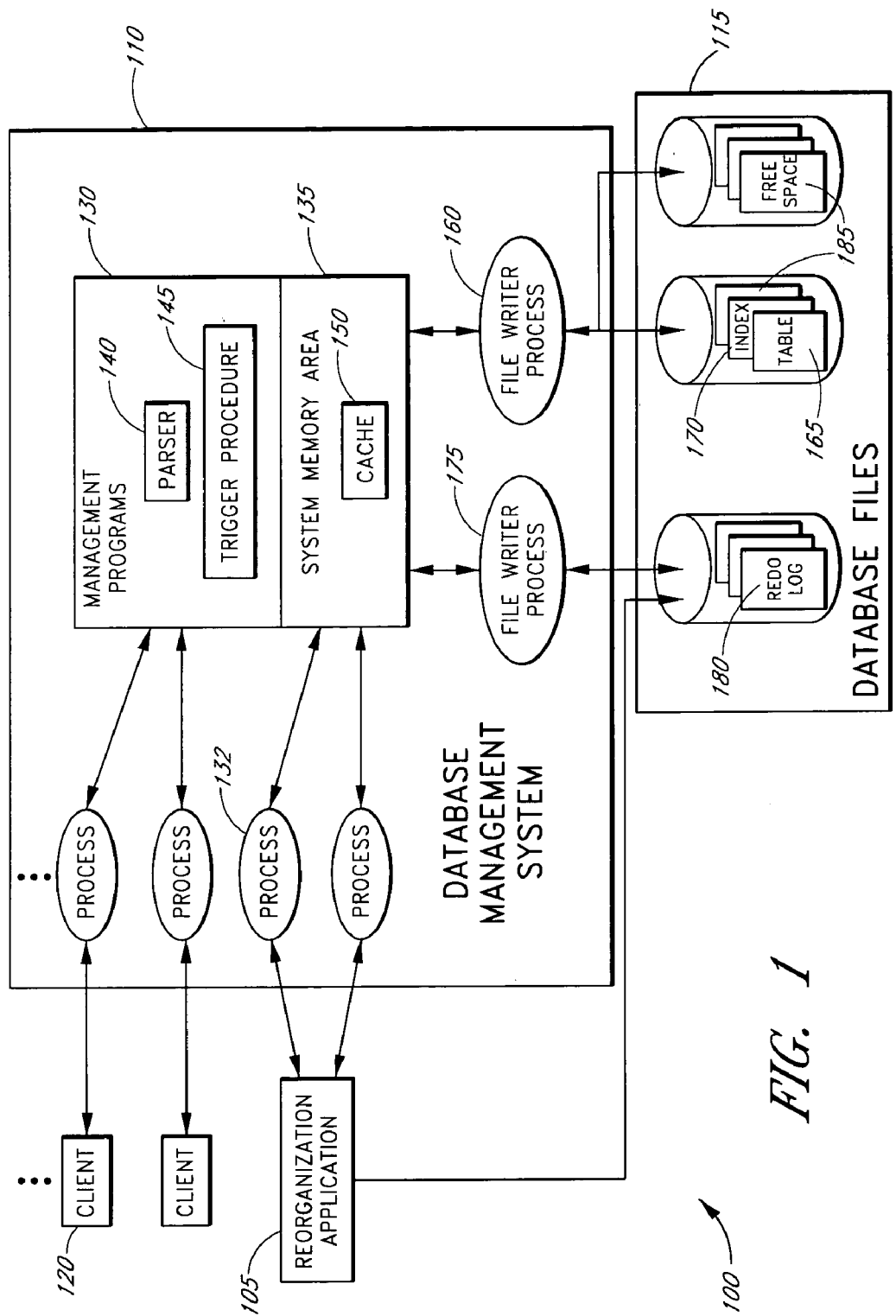
FIG. 1 illustrates a reorganization system according to aspects of an embodiment of the invention.

FIG. 1 illustrates a reorganization system 100 according to aspects of an embodiment of the invention. As shown in FIG. 1, the reorganization system 100 includes a reorganization application 105 communicating with a database management system (DBMS) 110 in order to modify or reorganize one or more objects of one or more databases stored in one or more database files 115. According to one embodiment, the reorganization application 105 comprises a software system designed to execute on a computing device, such as a conventional general-purpose computer, computer system, or computer network, having one or more microprocessors, such as, for example, an Intel- or Apple-based processor. Moreover, the general-purpose computer may include an appropriate operating system, such as, for example, an operating system capable of including graphics or windows, such as Windows, Unix, Linux, Mac OS, or the like.

FIG. 1 also shows the reorganization system 100 comprising the DBMS 110. According to one embodiment, the DBMS 110 comprises one or more software systems designed to allow one or more users or applications, hereinafter referred to as clients 120, to enter, modify, delete, or otherwise organize or interact with data stored in the database files 115. The DBMS software systems are commercially available from, for example, Oracle Corporation, IBM, or the like. Similar to the reorganization application 105, the DBMS 110 is designed to execute on a computing device, such as the foregoing conventional general-purpose computer, computer system, or computer network.

According to one embodiment, the database files 115 comprise devices designed to store large amounts of data, such as, for example, magnetic or optical drives, or drive systems. According to one embodiment, the database files 115 reside locally to the computer system of the DBMS 110.

According to one embodiment, the reorganization application 105 may advantageously reside on the same computing platform, system, or network, as that of the DBMS 110 and the database files 115. The reorganization application 105, the DBMS, and the database files 115 may advantageously pass data back and forth through a wide number of communication techniques know to one of ordinary skill in the art. Such communication techniques may provide for communication over a private communication network, public communication network, or both.

According to one embodiment, and as shown in FIG. 1, the reorganization application 105 may advantageously communicate directly with at least a portion of the database files 115, and may advantageously communicate indirectly with the database files 115 through the DBMS 110.

Although the reorganization system 100 is disclosed with reference to the foregoing embodiments, the invention is not intended to be limited thereby. Rather, a skilled artisan will recognize from the disclosure herein, a wide number of alternative embodiments of the reorganization system 100, including the various components executing on almost any computing device capable of sending or receiving information from another computer system. For example, the reorganization application 105, the DBMS 110, or the one or more database files 115, may individually or in various combinations, execute on a computer workstation, an interactive television, an interactive kiosk, a personal mobile computing device, such as a digital assistant, mobile phone, laptop, or the like, a wireless communications device, a smartcard, an embedded computing device, or the like, which can interact with a communication link to the other components of the reorganization system 100. In such alternative systems, the operating systems will likely differ and be adapted for the particular device. However, according to one embodiment, the operating systems advantageously continue to provide the appropriate communications protocols needed to establish communication between the various components of the reorganization system 100.

In addition, the reorganization application 105, the DBMS 110, the one or more database files 115, may individually or in various combinations, connect to one another through conventional service providers, such as, for example, a dial up, digital subscriber line (DSL), cable modem, fiber connection, or the like. Alternatively, or in addition to the foregoing, the reorganization application 105, the DBMS 110, or the one or more database files 115, may individually or in various combinations, connect to one another through network connectivity such as, for example, one or more public or private local or wide area networks.

FIG. 1 also illustrates the DBMS 110 comprising one or more management programs 130 and one or more system memory areas 135. The DBMS 110 spawns one or more processes 132 that communicate with the one or more clients 120 and the reorganization application 105. According to one embodiment, the management programs 130 include at least a parser 140 and a trigger procedure 145. The parser 140 preferably parses requested operations from the processes 132. According to one embodiment, the requested operations include structured query language (SQL) 101N statements comprising at least data modification language (DML) operations and data definition language (DDL) operations.

According to another embodiment, the trigger procedure 145 comprises a procedure applicable to objects of the database files 115, such as, for example, tables or the like. After application, the DBMS 110 implicitly executes the trigger procedure 145 when select operations, designed in the trigger procedure call, are requested against the object to which the trigger procedure 145 is applied. According to one embodiment, the trigger procedure 145 comprises a statement, a restriction, and an action. According to this embodiment, the statement comprises selectable SQL statements that cause the procedure to be executed, such as, for example, "insert," "update," or "delete." The restriction specifies which conditions are true before the actions will be executed, and the actions specify the SQL statement(s) that are executed upon detection of the select SQL statement and valid restriction.

FIG. 1 further illustrates the system memory area 135 comprising a cache 150. As is known to the skilled artisan, the cache 150 comprises high-speed memory for storing portions of the data found in the database files 115. The portions may advantageously include those portions predicted to likely be needed next by the DBMS 110. Such predictions may include use of the most recently used or most often used portion of data. From time to time, or when explicitly requested by one of the clients 120, the reorganization application 105, or the DBMS 110, the data in the cache 150 is written to the database files 115, bringing the data of the database files 115 in synchronization with the data in the cache 150. The DBMS 110 generally uses two processes for retrieving and writing data to the database files 115. For example, the DBMS 110 generally uses one or more file writer processes 160 to update tables 165 and indices 170 of the database files 115. In addition, the DBMS 110 may use one or more log writer processes 175 to keep a log of operations performed. According to one embodiment, the log includes a redo log 180.

As mentioned in the foregoing, the database files 115 may advantageously include one or more tables 165, one or more indices 170, the redo log 180, and free space 185. According to one embodiment of the invention, the reorganization application 105 uses the free space 185 to reorganize one or more of the tables 165 or the indices 170. According to one embodiment, the free space 185 includes data blocks currently not being used, scratchpad areas of the system memory area 135, or scratchpad areas of the database files 115.

According to one embodiment of the invention, the reorganization application 105 accesses one of the tables 165 in order to reorganize the data within that original table. The reorganization application creates a reorganized table, preferably within the free space 185 of the database files 115, and copies the data from the original table to the reorganized table using SQL statements. Once the original table and the reorganized table are in synchronization, the tables are switched, or renamed, such that all accesses by the clients 120 are to the reorganized table. This reorganization process is disclosed further with reference to FIG. 4.

According to one embodiment, in order to provide the clients 120 with continued access to the original table throughout the reorganization process, the reorganization application 105 employs the trigger procedure 145 to create one or more trigger locks. Each trigger lock provides the reorganization application 105 a mechanism for quiescing select operations to a table. For example, the reorganization application 105 applies the trigger lock to ensure that the original table synchronizes with a reorganized table, and applies the trigger lock to ensure that the reorganized table stays in synchronization throughout the renaming process and application of relational constraints.

FIG. 2 illustrates a block diagram of the operation of a trigger lock 200 according to aspects of an embodiment of the invention. As shown in FIG. 2, the operation of the trigger lock 200 illustrates the effect of the trigger lock 200 on an object 210. According to one embodiment, the trigger lock 200 includes statements and actions. The statements, along with various other information, define which operations will cause the trigger lock 200 to fire, or execute. The actions define the operations the trigger lock 200 presents when the statements and other information are found to be true.

As discussed in the foregoing, the object 210 may advantageously comprise a table being accessed and modified by one or more clients 120 and the reorganization application 105. As shown in FIG. 2, a first process 215 may attempt to apply a data modification operation, or statement, such as "insert," "update," or "delete" to one or more data found within the object 210. According to one embodiment, the first process 215 senses that it is attempting a statement included in the definition of the trigger lock 200, against the object 210, which is also included in the definition of the trigger lock 200. Accordingly, the first process 215 executes the trigger lock 200, and before the operation desired by the first process 215 is allowed to proceed, the first process 215 performs the one or more actions defined in the trigger lock 200.

According to one embodiment, the trigger lock 200 may advantageously present one or more SQL statements returning an error to the first process 215, thereby effectively blocking the one or more original data modification operations from modifying the data in the object 210. Thus, as shown in FIG. 2, when the first process 215 attempts to modify the data in the object 210, the first process 215 receives an error without gaining access thereto.

FIG. 2 also shows a second process 220. According to FIG. 2, the second process 220 may attempt to apply a structural modification operation, such as renaming the object 210 or applying one or more relational constraints thereto. According to one embodiment, the second process 220 senses that although it is attempting a statement against the object 210, the statement (operation), is not included in the definition of the trigger lock 200. Accordingly, the second process 220 does not execute the trigger lock 200, and the operation is allowed to execute. Thus, as shown in FIG. 2, the structural modification operation accesses the object 210, performs the modification, and returns a positive result to the second process 220.

FIG. 2 also shows a third process 225. According to this embodiment, the third process 225 may include a client attempting one or more read-only operations, such as, "select." Similar to the second process 220, the third process 225 senses that although it is attempting a statement against the object 210, the statement (operation), is not included in the definition of the trigger lock 200. Accordingly, the third process 225 does not execute the trigger lock 200, and the operation is allowed to execute. Thus, as shown in FIG. 2, the read-only operation accesses the object 210, acquires the data, and returns the data as the result to the third process 225.

Thus, based on the above, the trigger lock 200 provides a mechanism where the reorganization application 105 can quiesce select activities against an object while allowing for other activities to continue. For example, as disclosed in the foregoing, the reorganization application 105 can access a particular trigger procedure 145 of the DBMS 110 in a manner that creates the trigger lock 200. The trigger lock 200 then allows execution of at least read-only and structure modification operations, while blocking select data modification operations.

FIG. 3 illustrates an exemplary SQL statement 300 for creating the trigger lock 200 from the trigger procedure 145, according to aspects of yet another embodiment of the invention. As shown in FIG. 3, the SQL statement 300 includes the TRIGGERNAME 305, the STATEMENTS 310, an OBJECTNAME 315, and one or more actions 320. According to one embodiment of the invention, the TRIGGERNAME 305 comprises any name the reorganization application 105 uses to control the trigger lock 200. The STATEMENTS 310 include those SQL statements upon which the trigger lock 200 will execute or fire. According to one embodiment, the STATEMENTS 310 include "insert," "update," and "delete." The OBJECTNAME 315 preferably comprises the name of the object to be reorganized. According to one embodiment, the actions 320 include sending an error message. An error number and the error message may be defined by one of the reorganization application 105 or the DBMS 110.

Based on the foregoing, the exemplary SQL statement 300 advantageously uses the existing trigger procedure 145 of the DBMS 110 to create the trigger lock 200 that quiesces select activity against an object by returning, for example, an error to the requesting process. Moreover, the trigger lock 200 created from the exemplary SQL statement 300 advantageously allows at least read-only access and structural modification operations to be applied against the object.

Figure 4:
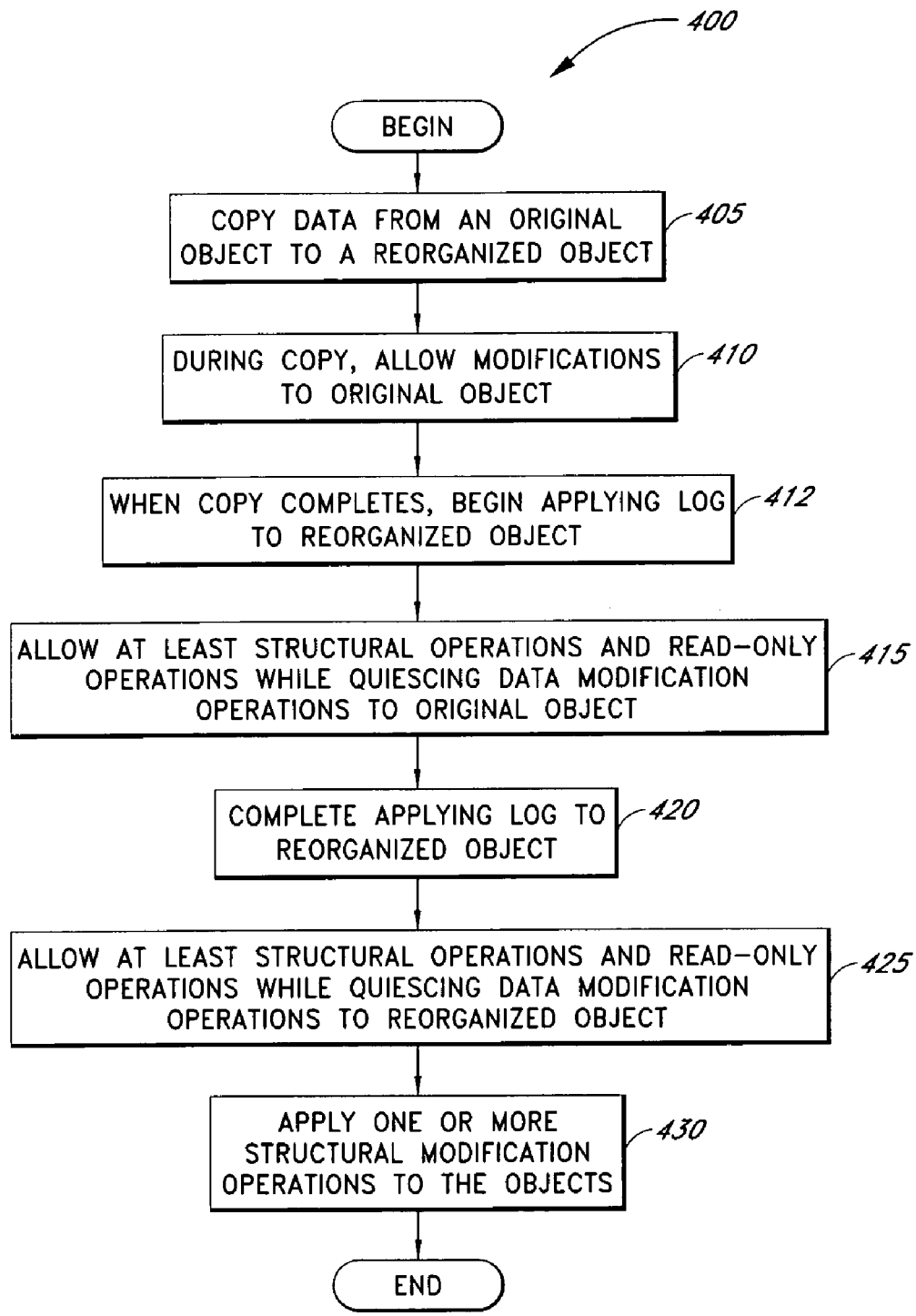
FIG. 4 illustrates a flowchart of a reorganization process according to aspects of another embodiment of the invention.

FIG. 4 illustrates a flowchart of a reorganization process 400 according to aspects of another embodiment of the invention. As shown in FIG. 4, the reorganization process 400 begins with BLOCK 405 where the reorganization application 105 begins copying data from an original object to a reorganized object. According to one embodiment, the process of copying data to the reorganized object accesses implicit and explicit functionality of the DBMS 110 to remove chained rows and fragmentation from the data that was found in the original object. In addition, although attributes of one or more objects are often set during their initial allocation, the reorganization application 105, the DBMS 110, or both, may advantageously reset or reallocate some or all of those attributes in the reorganized table. For example, the extent size, the percent of free space in a data block, or the like, may be optimized for the existing or predicted data to be stored in the reorganized table.

The reorganization process 400 continues with BLOCK 410, where during the copying process, the clients 120 are allowed to access and modify the data of the original object. Generally, the DBMS 110 advantageously stores a record of these modifications in the redo log 180. As shown in FIG. 4, when the copying process completes, at BOCK 412, the reorganization application 105 accesses the redo log 180, reads the records of the modifications, and advantageously begins applying those modifications to the reorganized object.

When the data from the original object is copied, and thereby reorganized, into the reorganized object, the reorganization process 400 continues with BLOCK 415. As shown in FIG. 4, BLOCK 415 where the reorganization application 105 allows at least structural operations and read-only operations while quiescing data modification operations to the original object. According to one embodiment, the reorganization application 105 applies the trigger lock 200 to the original object, in order to obtain the foregoing functionality.

The reorganization process 400 continues with BLOCK 420 where the reorganization application 105 finishes applying the modifications stored in the redo log 180 to the reorganized object. According to one embodiment, the modifications appearing in the redo log 180 may advantageously correspond to those modifications to the original object that occurred during the copying process, or those modifications to the original object that occurred since BLOCK 412, when the reorganization application 105 began applying modifications that occurred during the copying process.

Application of the trigger lock 200 to the original object during the application of the redo log 180 to the reorganized object, advantageously accomplishes several competing goals. For example, application of the trigger lock 200 allows at least continued read-only access for the clients 120 to the original object. Moreover, application of the trigger lock 200 allows the reorganization application 105 to synchronize the reorganized object to the original object through application of the redo log 180. For example, because the trigger lock 200 is blocking additional data modification operations to the original object, only a finite number of modifications need to be applied to the reorganized object before the two objects contain the same data, even though the data of the reorganized object may be stored so as to enhance performance of the same. In addition to the foregoing advantages, application of the trigger lock 200 to the original object allows the reorganization application 105 to apply structural modification operations to the original object as will be disclosed below.

The reorganization process 400 continues with BLOCK 425. As shown in FIG. 4, the reorganization process 400 at BLOCK 425 allows at least structural operations and read-only operations while quiescing data modification operations to the reorganized object. According to one embodiment, the reorganization application 105 applies the trigger lock 200 to the reorganized object. The reorganization process 400 continues with BLOCK 430 where the reorganization application 105 applies structural modification operations to the original and reorganized objects. For example, the reorganization application 105 advantageously renames the original object to another name, such as an archived, or archive-ready name. In addition, the reorganization application 105 advantageously renames the reorganized object to the name of the original object, such that future accesses by the clients 120 to the original object, are applied by the DBMS 110 to the reorganized object. According to one embodiment, the reorganization application 105 also applies relational constraints that were present on the original object, to the reorganized object. For example, the reorganization application 105 may advantageously apply one or more of the trigger procedures 145, or other mechanism, such as, for example, constraints, designed to keep related data consistent throughout multiple tables.

After renaming the original and reorganized objects, the reorganization process 400 removes the trigger lock 200 from the reorganized object, now named the original object, thereby restoring full access by the clients 120 thereto. As disclosed in the foregoing, the reorganization process 400 advantageously provides at least continued read-only access and structural modification access to the clients 120 and the reorganization application 105. Moreover, the reorganization process 400 accomplishes the foregoing while still synchronizing the data between the original object and the reorganized object. Accordingly, the reorganization process 400 advantageously produces a reorganized object within a database that includes reduced fragmentations and the removal of at least some of the chained rows, thereby increasing overall database performance.

Figure 5:
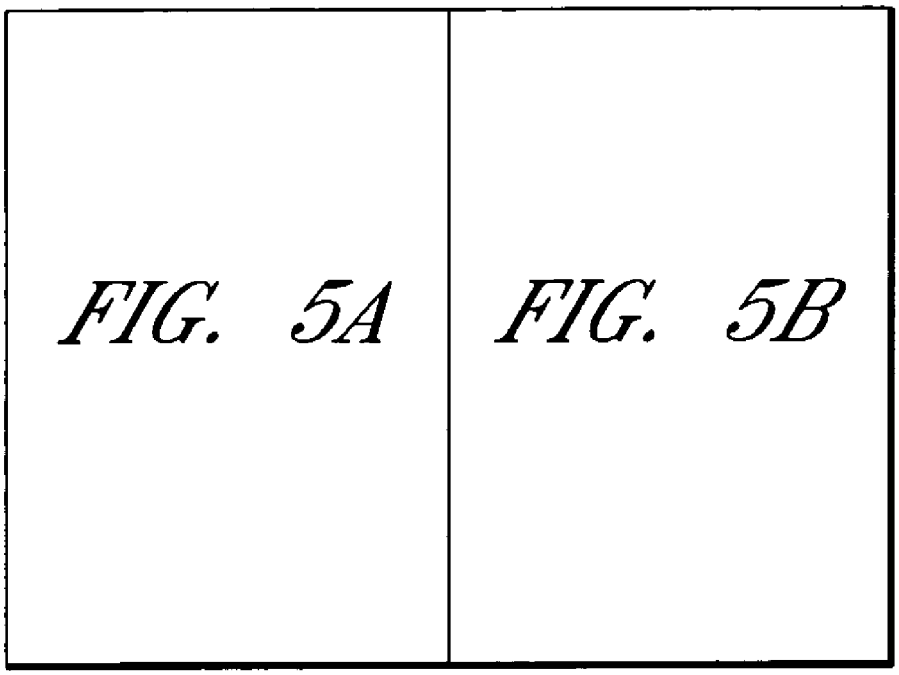
FIG. 5 illustrates a simplified data flow diagram of the reorganization process of FIG. 4, according to aspects of yet another embodiment of the invention.
Figure 5A:
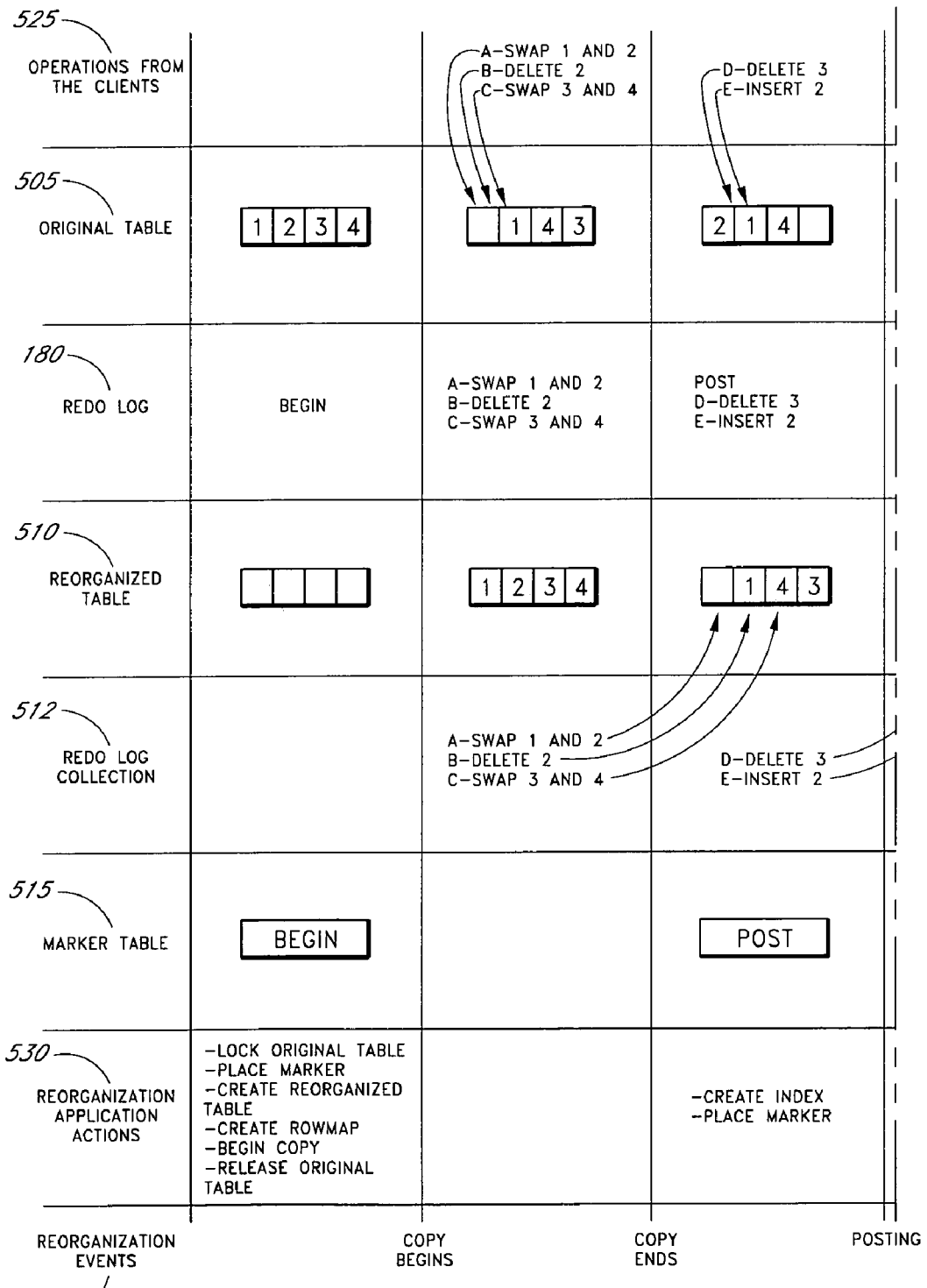
Figure 5B:
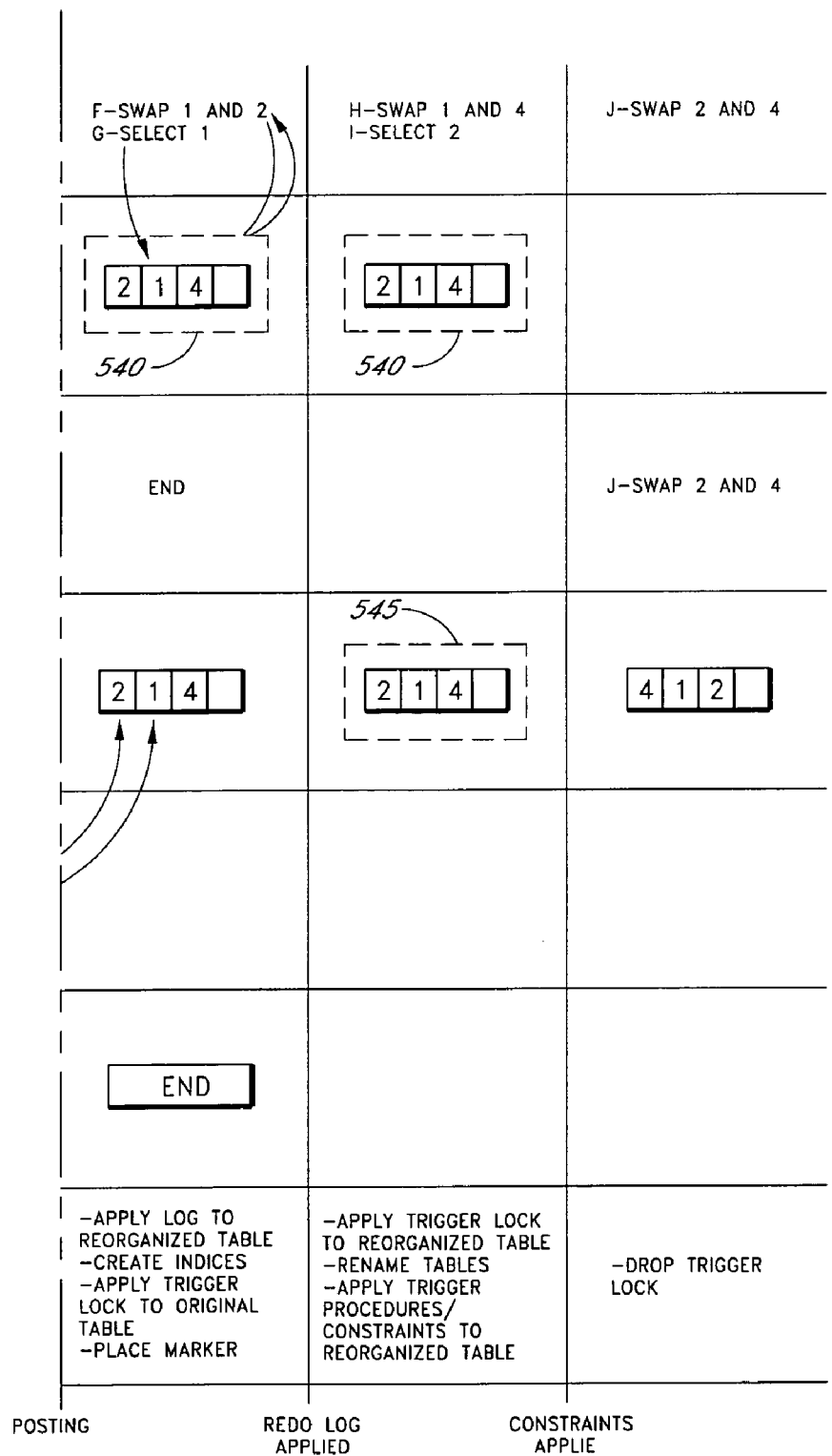

FIG. 5 illustrates a simplified data flow diagram of the reorganization process 400 of FIG. 4, according to aspects of yet another embodiment of the invention. In particular, FIG. 5 illustrates the state of an original table 505, a reorganized table 510, the redo log 180, a redo log collection 512, and a marker table 515, during various reorganization events 520. Moreover, FIG. 5 illustrates simplified exemplary operations 525 from the clients 120 and simplified exemplary actions 530 of the reorganization application 105, that may occur during the reorganization events 520.

According to an embodiment of the invention, the reorganization process 400 begins when the reorganization application 105 places a marker in the DBMS 110 to indicate an initial synchronization point. According to one embodiment, the reorganization application 105 uses a false table, or the marker table 515, to provide markers to the DBMS 110. According to this embodiment, the reorganization application 105 places one or more markers in the DBMS 110 at a time when activity against the original table 505 or the reorganized table 510 may be partially quiesced, for example, through application of the trigger lock 200. Therefore, use of the marker table 515, which is not quiesced, advantageously provides a convenient and accessible location for synchronization markers to be inserted into the redo log 180.

According to one embodiment, the reorganization application 105 forces an initial synchronization point by explicitly requesting a DML lock against the original table 505. As discussed in the foregoing, explicit DML locks will block transactions from other clients during the transaction between the reorganization application 105 and the original table 505. While the reorganization application 105 has the DML lock, the reorganization application 105 performs a number of tasks. According to one embodiment, the reorganization application 105 places a BEGIN marker in the marker table 515, followed by an explicit request to COMMIT the placement. As shown in FIG. 5, the placement of the BEGIN marker, followed by the COMMIT statement, advantageously places a record of the BEGIN marker in the redo log 180. The BEGIN marker in the redo log 180 signals the reorganization application 105 to begin collecting any modification operations against the original table 505.

In addition to the foregoing tasks, according to one embodiment of the invention, the reorganization application 105 also creates the structure of the reorganized table 510 and submits the copy table operations to the DBMS 110. Thereafter, the reorganization application 105 releases the DML lock against the original table 505 such that the clients 120 may apply modifications thereto. While the creation of the reorganized table 510 may include, but is not limited to, one or more DDL operations, because the operations are executed against the reorganized table 510 and not the DML locked table (the original table 505), the reorganization application 105 may advantageously keep the DML lock against the original table 505.

In addition, the DBMS 110 generally provides that although the original table 505 may change during the copying process, because, for example, the copying process may be relatively long and involved, when the copying process finishes, the reorganized table 510 will include the data as the data existed at the time of the copying process began. This functionality is generally referred to as read consistency, and is generally available implicitly within the DBMS 110, through transaction isolation. For example, the DBMS 110 generally provides for serializable isolation-level operations, as will be understood by an artisan skilled in the art of DBMS design.

According to one embodiment, the reorganization application 105 also creates a rowmap, mapping the location of each data block of the original table 505 to, for example, a header row identifier (HRID). According to this embodiment, the DBMS 110 may chain data blocks of a particular row using, for example, structures analogous to linked lists having pointers. These chained data blocks are often referred to as chain rows. Because the DBMS 110 may not include information in the redo log 180 allowing the reorganization application 105 to find the beginning of a particular row (HRID), the rowmap advantageously maps the location of each block to the HUD. According to one embodiment of the invention, the rowmap is dynamically generated during the copying process, using, for example, information found in the data blocks of the original table 505 and information from data blocks found in the redo log file 180, such as, for example, timestamp information. According to one embodiment, the reorganization application 105 builds the rowmap using information corresponding to the oldest timestamp. According to another embodiment of the invention, the rowmap is statically generated using the information of the data blocks of the original table 505.

As shown in FIG. 5, after the BEGIN marker is placed and the rowmap is created, the DML lock is released and the clients 120 have access to the original table 505. For example, FIG. 5 illustrates the clients 120 requesting simplified exemplary operations 525, such as operations "A," "B," and "C" against the original table 505. As the operations 525 are applied to the original table 505, the DBMS 110 appends a record thereof in the redo log 180. Because the BEGIN marker has been placed, the reorganization application 105 collects the modification operations from the redo log 180 into the redo log collection 512. According to one embodiment, the reorganization application 105 accesses the redo log 180 directly, rather than through the DBMS 110. However, a skilled artisan will recognize that the redo log collection 512 may advantageously be stored in a number of different areas of the reorganization system 100, such as, for example, the memory of the DBMS 110 or the database files 115. According to another embodiment, the redo log collection 512 comprises a list located in the memory of the computing platform upon which the reorganization application 105 executes.

According to one embodiment of the invention, once the copy process completes, the reorganization application 105 creates one or more indices on the reorganized table 510, and places another marker, a POST marker, in the marker table 515. According to this embodiment, the newly created one or more indices represents an index of the most selective data in the reorganized table 510. The reorganization application 105 uses this index to increase the speed of subsequent posts, or updates from the redo log collection 512, against the reorganized table 510.

According to one embodiment, when the original table 505 has a primary key already indexed, the reorganization application 105 recreates that index on the reorganized table 510. Use of the primary key index is advantageous because the primary key includes unique data for each record. When the original table 505 does not include a primary key index, the reorganization application 105 searches for unique data indices on various non-nullable columns. When more than one unique data index exists, the reorganization application 105 recreates the index containing the fewest columns. When no unique data index exists, the reorganization application 105 searches for any index containing the fewest columns. According to one embodiment, when no index existed in the original table 505, the reorganization application 105 does not create an index in the reorganized table 510.

According to another embodiment, the POST marker notifies the reorganization application 105 to begin posting those modification operations to the reorganized table 510, which are stored in the redo log collection 512 and have received corresponding commit statements. According to this embodiment, the reorganization application 105 employs the rowmap to determine how to apply the modification operations to the reorganized table 510. For example, when the modification operation corresponds to an update command, the reorganization application 105 (A) reads the block location from the redo log 180, and (B) uses the block location and the rowmap to determine the HRID. The reorganization application 105 then (C) uses the HRID to get at least one key from the last read consistency image, for example, the read consistency image corresponding to the original table 505 at beginning of the copying processes. The reorganization application 105 also (D) uses the HRID to get the modified data from the next read consistency image, for example, the read consistency image corresponding to the original table 505 at end of the copying processes. The reorganization application 105 then (E) uses the key and the modified data to update the reorganized table 510.

When the modification operation corresponds to an insert command, the reorganization application 105 performs (A) and (B), and skips (C). The reorganization application 105 at (D) uses the HRID to get the at least one key and the new data from the next read consistency image. The reorganization application 105 then (E) uses the key to insert the new data into the reorganized table 510.

When the modification operation stored in the redo log 180 corresponds to a delete command, the reorganization application 105 performs (A) through (C), and skips (D). The reorganization application 105 at (E) uses the key to delete the row from the reorganized table 510. Therefore, as disclosed in the foregoing, the reorganization application 105 advantageously employs the rowmap to determine the HRID from the information stored in the redo log 180. Then, depending upon the type of operation, the reorganization application 105 determines which key and which modified data correspond to the entry in the redo log 180. Then, the reorganization application 105 uses the key to determine the row and data in the reorganized table 510 to modify.

Although the use of the rowmap and the redo log 180 is disclosed with reference to different embodiments, the invention is not intended to be limited thereby. Rather, a skilled artisan will recognize from the disclosure herein that the application of the redo log 180 will to some degree be governed by the type of information stored to and read from the redo log 180.

During the foregoing posting of the modifications from the redo log 180 to the reorganized table 510, the reorganization application 105 continues to allow the clients 120 to access the original table 505 and make modification. As shown in FIG. 5, operations "D," and "E," are applied to the original table 505 as operations "A" through "C" are applied to the reorganized table 510. The reorganization application 105 continues to monitor the redo log 180 and continues to collect modification operations in the redo log collection 512. Thus, the reorganization application 105 includes operations "D," and "E" in the redo log collection 512.

According to one embodiment, the reorganization application 105 also creates any indices on the reorganized table 510, which existed on the original table 505. By allowing continued access to the original table 505 during the application of the redo log 180 and the generation of the indices, the reorganization system 100 advantageously decreases the amount of time the clients 108 will be unable to perform data modification operations against the data of the original table 505.

According to one embodiment, when the reorganization application 105 determines that the posting of operations from the redo log collection 512 has caught up to the incoming operations in the redo log 180, and the indices have been applied against the reorganized table 510, the reorganization application 105 advantageously applies the trigger lock 540 to the original table 505 and places an END marker in the marker table 515. According to one embodiment of the invention, the trigger lock 540 is similar to the trigger lock 200 disclosed in foregoing with reference to FIG. 2. For example, similar to the trigger lock 200, the trigger lock 540 advantageously prevents further data modification operations from the clients 120 against the original table 505. For example, as shown in FIG. 5, when operation "F" attempts to modify the data of the original table 505, the trigger lock 540 rejects the operation. On the other hand, when the read-only operation, operation "G," attempts to read selected data, the trigger lock 540 allows the operation to continue. Thus, as disclosed in the foregoing, the trigger lock 540 advantageously provides read-only access to the original table 505 while quiescing select data modification operations against the same.

Meanwhile, the reorganization application 105 continues collecting operations from the redo log 180 and placing them in the redo log collection 512 until the reorganization application 105 finds the END marker. Moreover, the reorganization application 105 continues to post operations from the redo log collection 512 against the reorganized table 510 until the redo log collection 512 is empty. Thus, as shown in FIG. 5, when the redo log collection 512 is empty, the original table 505 and the reorganized table 510 are in synchronization. Through the employment of the trigger lock 540, the marker table 515, and the redo log collection 512, the reorganization application 105 and the reorganization process 400 advantageously provide for the synchronization of the original table 505 and the reorganized table 510 without the occurrence of a destructive or interrupting data modification operation. Moreover, the reorganization application 105 and the reorganization process 400 advantageously allow at least continued read-only access and structural modification access to the clients 120 and the reorganization application 105.

After the two table are synchronized, the reorganization application 105 applies a trigger lock 545 to the reorganized table 510. The trigger lock 545 is similar to the trigger lock 200 disclosed in the foregoing with reference to FIG. 2. With the trigger locks 540 and 545 in place, the reorganization application 105 performs the DDL operations of changing the names of the respective tables. For example, according to one embodiment of the invention, the reorganization application 105 changes the name of the original table 505 to something out of the way, such as, for example, an archive name or other name that does not conflict with other objects of the database files 115. Because the name changing operation is not a data modification operation, the trigger lock 540 allows the operations to occur against the original table 505.

In addition, according to an embodiment of the invention, the reorganization application 105 advantageously renames the reorganized table 510 to the former name of the original table 505. Thus, operations from the clients 120 designated for the original table 505, will now be applied by the DBMS 110 to the reorganized table 510. However, according to one embodiment, before the clients 120 have data modification access to the reorganized table 510, the reorganization application 105 recreates any relational constraints of the original table 505, on the reorganized table 510.

According to one embodiment, the application of the relational constraints involves applying trigger locks, such as, for example, the trigger lock 200, to objects other than the original table 505 and the reorganized table 510. For example, when the original table 505 comprises the child table of a parent-child relational constraint having cascaded deletes, the reorganization application 105 may advantageously apply a trigger lock on the parent table. The trigger lock advantageously fires upon receipt of a delete operation against the parent table, and blocks it. Because the original relational constraint against the parent table is dropped when the original table 505 is renamed, the foregoing trigger lock prevents delete operations that would destroy data integrity between the parent and child (the original table 505).

In contrast, according to an embodiment where the original table 505 comprises the parent table of the parent-child relational constraint, the reorganization application 105 may advantageously apply a trigger lock on the child table. The trigger lock advantageously fires upon receipt of an insert or update operation against the child table, and blocks it. Because the original relational constraint against the child table is dropped when the original table 505 is renamed, the foregoing trigger lock prevents insert or update operations that would destroy data integrity between the parent (the original table 505) and child. As will be apparent to a skilled artisan from the disclosure herein, a particular table may comprise the parent or the child in numerous parent-child relationships, and that the reorganization application 105 may advantageously apply trigger locks, similar to the foregoing, on the associated children or parent tables.

During the application of the foregoing trigger locks, the reorganization application may advantageously apply the relational constraints to the reorganized table 505 and the associated other tables. For example, the reorganization application 105 may advantageously create one or more trigger procedures 145 on the reorganized table 510. Thereafter, the trigger lock 545 is dropped and data modification access by the clients 120 is allowed.

Thus, according to the above, once the reorganization process 400 completes, the reorganized table 510 has the name of the original table 505 and advantageously includes the data, in reorganized form, of the original table 505. The reorganized table 510 also advantageously includes the data modification operations that occurred during a majority of the reorganization process 400, as well as the relational constraints of the original table 505.

According to one embodiment of the invention, the reorganization application 105 may advantageously employ multiple threads of parallel execution to complete the reorganization process 400 disclosed in the foregoing with reference to FIGS. 4 and 5. According to one embodiment, the reorganization application 105 may employ a command thread 600 and a log posting thread 700.

Figure 6:
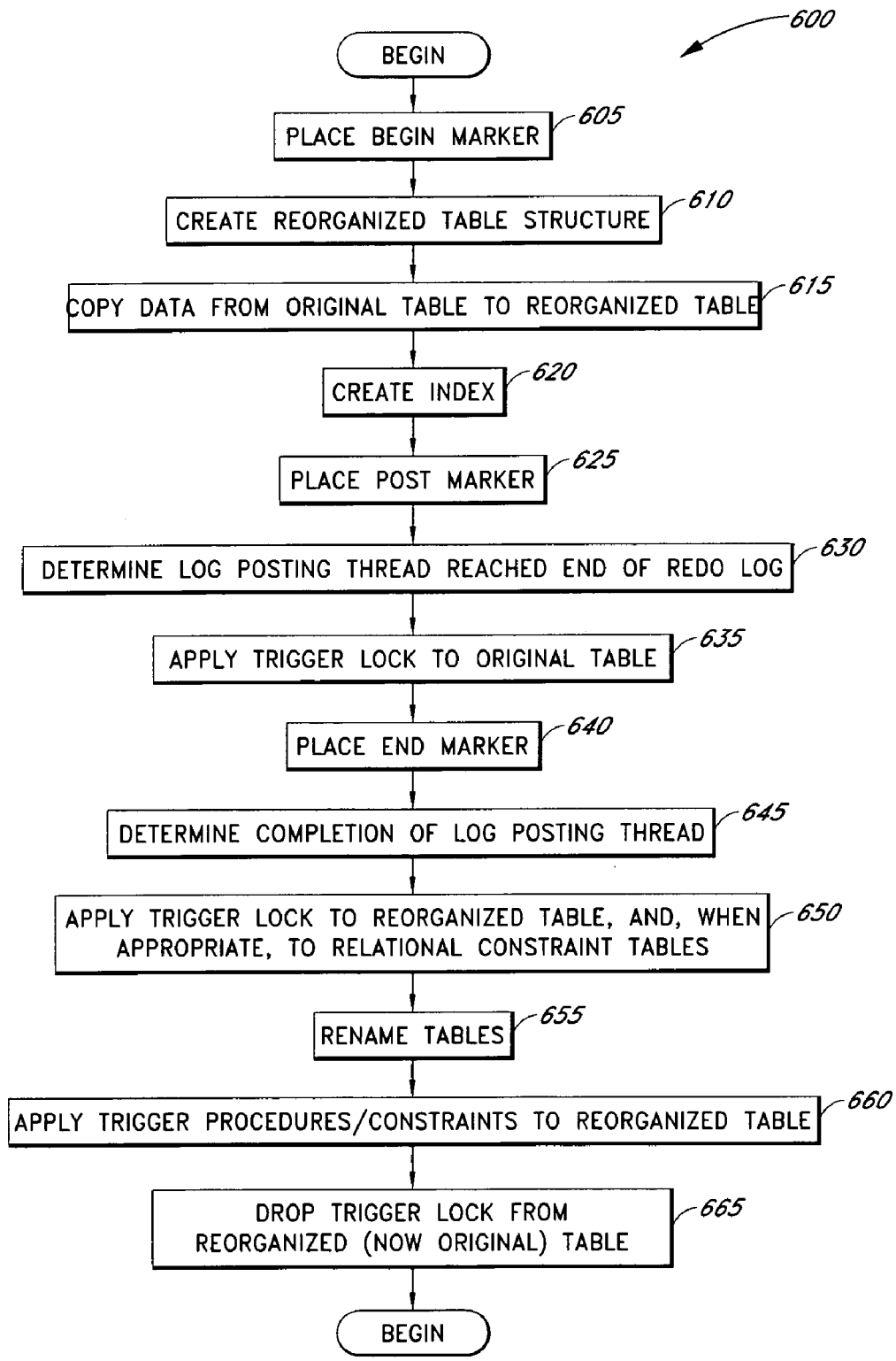
FIG. 6 illustrates a command thread of execution according to aspects of yet another embodiment of the invention.

FIG. 6 illustrates the command thread 600, according to aspects of yet another embodiment of the invention. The command thread 600 begins at BLOCK 605 by placing the BEGIN marker and at BLOCK 610 by creating the structure of the reorganized table 510. As disclosed in the foregoing, the reorganization application 105 may advantageously obtain a DML lock against the original table 505 during BLOCKS 605 and 610. The command thread 600 continues at BLOCK 615 by copying the data from the original table 505 to the reorganized table 510. As discussed in the foregoing and according to one embodiment of the invention, the process of copying the data removes fragmentation and at least some of the chained rows from the reorganized table, thereby creating a better performing table.

After the copying operations completes, according to one embodiment, the command thread 600 continues to BLOCK 620 by recreating on the reorganized table 510 the most selective index originally applied to the original table 505. By applying at least one index to the reorganized table 510, the log posting thread 700 can more quickly post to the reorganized table 510. Although the command thread 600 is disclosed with reference to its preferred embodiment, the invention is not intended to be limited thereby. Rather, a skilled artisan will recognize from the disclosure herein that different indices, or no indices, may advantageously be applied to the reorganized table 510.

After the reorganization application 105 creates the foregoing index or indices, the command thread 600 continues to BLOCK 625 and places the POST marker. Placement of the POST marker advantageously signals the log posting thread 700 to begin posting the operations it has collected since the command thread 600 placed the BEGIN marker. One reason for waiting until the copying process completes before beginning to post from the redo log collection 512, or directly from the redo log 180, is to avoid destructive interaction between the posting and the copying process. For example, when one of the clients 120, at the beginning of the copying process, attempts to modify data located near the end of the original table 505, the reorganized table 510 may not yet even include the corresponding data. Therefore, an attempt to update the data in the reorganized table 510 would fail. However, by employing the POST marker, the reorganization process 400 advantageously ensures that the copy process is complete and the data is available in the reorganized table 510 before the modifications are applied.

After placing the POST marker, the command thread 600 continues with BLOCK 630 where the command thread 600 determines whether the log posting thread 700 has collected operations from the redo log 180 right up to the end thereof. Thereafter, the command thread 600, at BLOCK 635, applies the trigger lock 540 to the original table 505. By waiting until the log posting thread 700 indicates it has reached the end of the redo log 180, the reorganization application 105 provides data modification access to the clients 120 right up until the renaming operations. Because the renaming operations are relatively short, the total time the clients 120 will not have full data modification access to the data of the original table 505 is substantially decreased.

Once the command thread 600 applies the trigger lock 540 to the original table 505, the command thread 600 continues to BLOCK 640 and places the END marker. The END marker advantageously signals the log posting thread 700 that the trigger lock 540 has been applied to the original table 505. Because the trigger lock 540 does not allow select data modification operations to the original table 505, the redo log 180 will no longer need to be searched for redo log entries.

The command thread 600 then continues to BLOCK 645 where it waits for the completion of the log posting thread 700. Completion of the log posting thread 700 signals to the command thread 600 that the operations applied to the original table 505 have now been applied to the reorganized table 510, and the two tables are now in synchronization. Then, the command thread 600 at BLOCK 650, applies the trigger lock 545 to the reorganized table 510 and, as disclosed in the foregoing, may advantageously apply one or more trigger locks to various relational constraint tables. At BLOCK 655, the command thread 600 renames the tables. At BLOCK 660, the command thread 600 applies relational constraints from the original table 505 to the reorganized table 510. As disclosed in the foregoing, the trigger locks 540 and 545 advantageously allow the renaming and constraint applications to take place, while blocking various data modification operations from interrupting, or otherwise destructively interacting with the original table 505 and the reorganized table 510.

The command thread 600 then proceeds to BLOCK 665 and drops the trigger lock 545 from the reorganized table 510, now renamed the name of the original table 505. Thus, the clients 120 may advantageously fully interact with the reorganized table 510. In addition, as disclosed in the foregoing, the performance of the reorganized table 510 exceeds that of the original table 505 due to the reorganization of the data therein.

Figure 7:
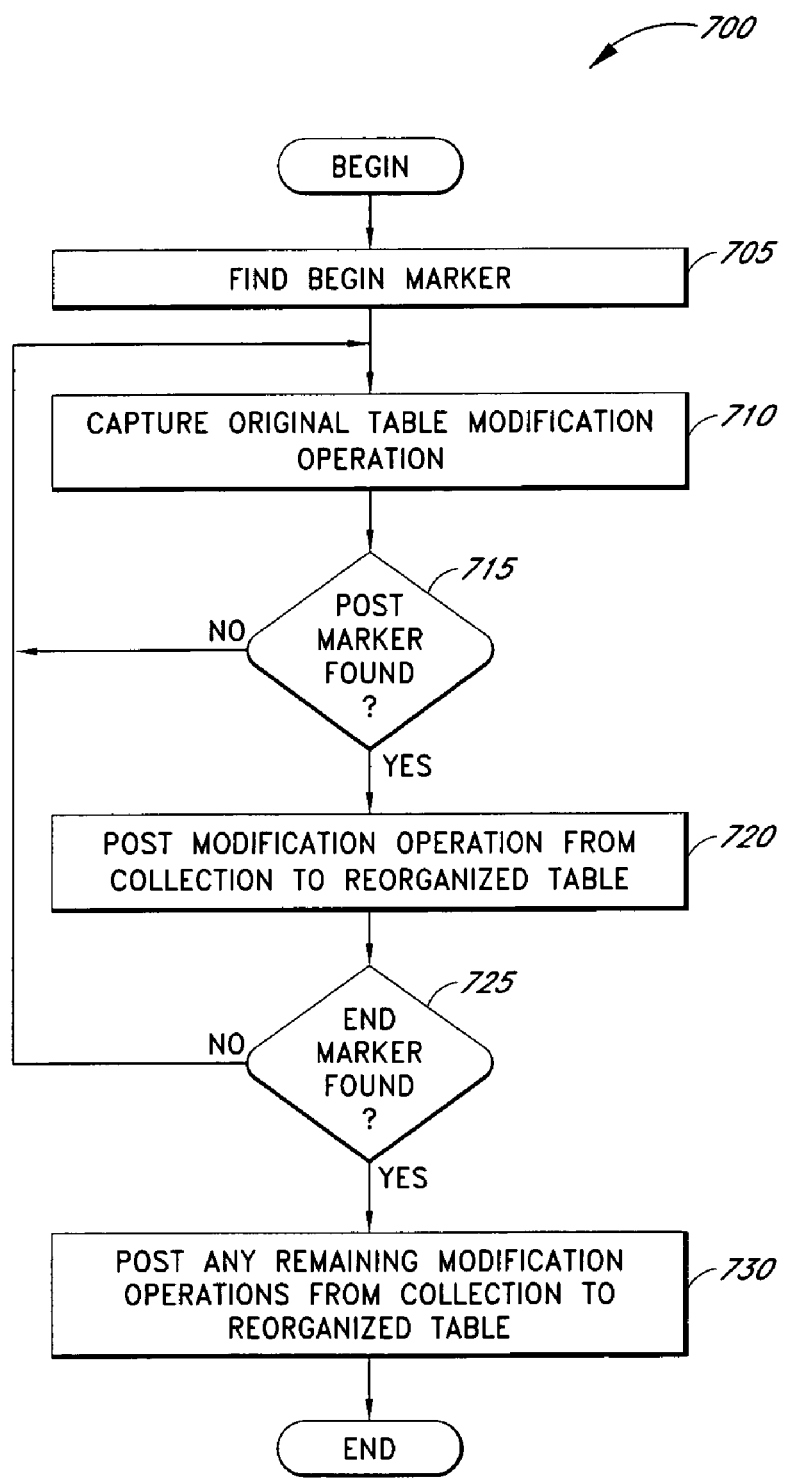
FIG. 7 illustrates a log posting thread of execution according to aspects of another embodiment of the invention.

FIG. 7 illustrates the log posting thread 700 according to aspects of another embodiment of the invention. According to an embodiment of the invention, the log posting thread 700 comprises one or more threads of execution. According to one embodiment, at least one thread may advantageously directly access the redo log 180 without employing the DBMS 110, and capture data from the redo log 180, while at least one other thread may advantageously post the captured data to the reorganized table 510.

Direct assess to the redo log 180 advantageously avoids drawbacks related to some DBMSs that have inherent efficiencies involved with obtaining data from the redo logs. Moreover, direct access of the redo log 180 also advantageously allows the log posting thread 700 to determine which data of the redo log 180 to use and which data to ignore.

Although the foregoing is disclosed with reference to direct access of the redo log 180, the invention is not intended to be limited thereby. Rather, a skilled artisan will recognize that data of the redo log 180 may be accessed through the DBMS 110, and in particular, the skilled artisan will recognize the log posting thread 700 may employ the DBMS 110 to access the redo log 180.

As shown in FIG. 7, the log posting thread 700 begins at BLOCK 705 where the log posting thread 700 seeks the BEGIN marker in the redo log 180 of the database files 115. Once the log posting thread 700 finds the BEGIN marker, the log posting thread knows that the command thread 600 has designated an initial synchronization point. Accordingly, the log posting thread begins at BLOCK 710 to capture operations found in the redo log 180 that are applied against the original table 505. According to one embodiment, the log posting thread 700 collects the operations from the redo log 180, employs the rowmap to determine the key and modification data from the read consistency images, and stores the information in the redo log collection 512. According to one embodiment, the redo log collection 512 may advantageously comprise one area where the key and modification data are stored, and another area where the key and modification data are stored once the operation corresponding thereto is committed.

As shown in FIG. 7, the log posting thread 700 then checks at BLOCK 715 for the POST marker in the redo log 180. When the POST MARKER has not been found, the log posting thread 700 returns to BLOCK 710 and attempts to collect more operations. On the other hand, when the log posting thread 700 has found the POST marker, the log posting thread 700 proceeds to BLOCK 720 and begins posting the operations it has collected from the redo log 180 against the reorganized table 510. According to one embodiment, a given operation is not posted against the reorganized table 510 until that operation has been committed by the client 120. As disclosed in the foregoing, the collection of records of the operations may be stored in the redo log collection 512.

After posting an operation from the redo log collection 512, the log posting thread 700 checks at BLOCK 725 whether the END marker has been found in the redo log 180.

When the END marker has not been found, the log posting thread 700 returns to BLOCK 710 and attempts to collect more operations from the redo log 180. On the other hand, when the log posting thread 700 determines at BLOCK 725 that the END marker has been found, the log posting thread 700 proceeds to BLOCK 730, where the log posting thread 700 posts, or applies, any remaining operations collected from the redo log 180, to the reorganized table 510. Once the log posting thread completes applying collected modification operations, the log posting thread 700 ends.

Although the foregoing invention has been described in terms of certain preferred embodiments, other embodiments will be apparent to those of ordinary skill in the art from the disclosure herein. Additionally, other combinations, omissions, substitutions and modifications will be apparent to the skilled artisan in view of the disclosure herein. Accordingly, the present invention is not intended to be limited by the reaction of the preferred embodiments, but is to be defined by reference to the appended claims.

What is claimed is:

1. A method of reorganizing a table in a database file while providing clients of the database file continuous access to data stored in the table, the method comprising:

reorganizing data of an original table by copying the data to a reorganized table;

during the copying, allowing modifications to the data of the original table while collecting records of the modifications;

when the copying completes, applying the modifications from the collected records against the reorganized table;

applying a first partial lock to the original table, the first partial lock blocking select data modification operations against the original table while allowing other operations against the original table;

applying any remaining modifications from the collected records against the reorganized table;

applying a second partial lock to the reorganized table, the second partial lock blocking select data modification operations against the reorganized table while allowing other operations against the reorganized table during the reorganization such that the reorganized table remains continuously accessible during the reorganization;

substituting the reorganized table for the original table such that the reorganized table remains accessible while substituting the reorganized table for the original table; and removing the second partial lock, wherein additional more-restrictive locks to the original table are not needed during the method of reorganizing the original table, thereby providing clients of the original table continuous access to the data during the reorganization through at least the other operations allowed by the first partial lock.

2. The method of claim 1, wherein the other operations allowed by at least one of the first and second partial locks comprises one or more structural modification operations.

3. The method of claim 1, wherein the other operations allowed by at least one of the first and second partial locks comprises one or more read-only operations.

4. The method of claim 1, further comprising:

during the application of the modifications from the collected records against the reorganized table, allowing additional modifications to the data of the original table while collecting additional records of the additional modifications; and when the modifications and at least portions of the additional modifications have been applied against the reorganized table, applying the first partial lock to the original table;

wherein the step of applying any remaining modifications includes applying any remaining modifications or additional modifications against the reorganized table.

5. The method of claim 1, wherein when the original table included one or more relational constraints, the method further comprises applying at least one of the one or more relational constraints to the reorganized table.

6. The method of claim 5, wherein the application of the at least one relational constraint to the reorganized table includes applying a trigger procedure to the reorganized table.

7. The method of claim 5, wherein the application of the at least one relational constraint to the reorganized table includes applying a partial lock to another table.

8. The method of claim 1, wherein the original table includes a table name, and wherein the step of substituting the reorganized table for the original table further comprises renaming the original table another name and naming the reorganized table the table name.

9. The method of claim 1, further comprising archiving the original table.

10. The method of claim 1, wherein the copying of the data of the original table to the reorganized table further comprises creating an original synchronization point, after which the records of modifications are collected.

11. The method of claim 1, wherein before the application of the second partial lock, the original table and the reorganized table are in synchronization with one another.

12. A method of reorganizing an object in a database, the method comprising:

reorganizing an original object by copying data from the original object to a reorganized object;

applying a first partial lock to the original object, the first partial lock blocking data modification operations from modifying the original object while allowing other operations to access the original object, wherein additional more-restrictive locks to the original object are not needed during the method of reorganizing the original object, thereby providing clients of the original object continuous access to the data during the reorganization through at least the other operations allowed by the partial lock;

applying a second partial lock to the reorganized table, the second partial lock blocking select data modification operations against the reorganized table while allowing other operations against the reorganized table during the reorganization; and substituting the reorganized object with the original object such that the reorganized object remains readable while substituting the reorganized object for the original object.

13. The method of claim 12, wherein the other operations include one or more read-only operations.

14. The method of claim 12, wherein the other operations include one or more structural modification operations.

15. A computer-implemented method of reorganizing an object in a database file, the method comprising:

reorganizing an original object by copying data from the original object to a reorganized object;

applying a first partial lock to the original table, the first partial lock blocking select data modification operations against the original table while allowing other operations against the original table;

applying a second partial lock to the reorganized object, the second partial lock blocking data modification operations from modifying the reorganized object, while allowing other operations to access the reorganized object, wherein the reorganized object remains accessible during reorganization; and substituting the reorganized object with the original object such that the reorganized object remains readable while substituting the reorganized object for the original object.

16. The method of claim 15, wherein the other operations include one or more read-only operations.

17. The method of claim 15, wherein the other operations include one or more structural modification operations.

18. The method of claim 15, wherein the one or more structural modification operations include consecutive data definition language operations.

19. A reorganization system, comprising:
at least one database file having a table of data and a log file;
a database management system communicating with the at least one database file, thereby governing the modification of the data in the table; and
a reorganization application communicating with the database management system to access the table and communicating with the database file to access the log file, wherein the reorganization application is configured to copy the data of the table to a reorganized table, to apply modifications from the log file corresponding to modifications to the table during the copying of the data, and to substitute the reorganized table for the table, thereby reorganizing the data of the table, wherein the reorganization application is further configured to apply a first partial lock to the table, thereby blocking select data modification language operations while allowing at least read-only operations, wherein additional more-restrictive locks to the table are not needed during reorganization of the table, thereby providing clients of the table access to the data during the reorganization through at least the other operations allowed by the first partial lock, and wherein the reorganization application is further configured to apply a second partial lock to the reorganized table, thereby blocking select data modification language operations while allowing at least read-only operations and wherein the reorganized table remains readable when the reorganization application substitutes the reorganized table for the table.

20. The reorganization system of claim 19, wherein the second partial lock blocks select data modification language operations while allowing one of one or more read-only operations and one or more data definition language operations.

21. A reorganization application for reorganizing an object in a database, the reorganization application comprising an execution thread which reorganizes an original object by copying data of the original object to a reorganized object, and which applies a first partial lock to the original object, wherein the first partial lock blocks data modification operations from modifying the original object while allowing other operations to access the original object thereby providing clients of the original object access to the data during the reorganization through at least the other operations allowed by the first partial lock, and wherein a second partial lock is applied to the reorganized object such that the reorganized object remains readable when substituting the reorganized object for the original object.

22. The reorganization application of claim 21, wherein the other operations include one or more read-only operations.

23. The reorganization application of claim 21, wherein the other operations include one or more structural modification operations.

24. A computer-implemented reorganization application for reorganizing an object in a database, the reorganization application comprising an execution thread which reorganizes an original object by copying data of the original object to a reorganized object, and which applies a first partial lock to the original object and a second partial lock to the reorganized object, wherein the second partial lock blocks data modification operations from modifying the reorganized object while allowing other operations to access the reorganized object, and wherein the reorganized object remains readable when substituting the reorganized object for the original object.

25. The reorganization application of claim 24, wherein the other operations include one or more read-only operations.

26. The reorganization application of claim 24, wherein the other operations include one or more structural modification operations.

27. A computer-implemented reorganization application for reorganizing an object in a database, the reorganization application comprising an execution thread which reorganizes an original object by copying data of the original object to a reorganized object and which substitutes the reorganized object for the original object, wherein the execution thread applies a first partial lock to the original object and a second partial lock to the reorganized object that allows read-only access to the data during the substitution of the reorganized object for the original object while blocking other access to the data and wherein the reorganized object remains continuously accessible during reorganization.

28. The reorganization application of claim 27, wherein the read-only access to the data includes read-only access during multiple data definition language operations.

* * * * *